United States Patent
Kim et al.

(10) Patent No.: US 11,774,377 B2
(45) Date of Patent: Oct. 3, 2023

(54) REAL-TIME INLINE DIGITAL TOMOSYNTHESIS SYSTEM

(71) Applicant: JPI Healthcare CO., LTD., Seoul (KR)

(72) Inventors: Kyong-Woo Kim, Jeollabuk-do (KR);
Heesin Lee, Jeollabuk-do (KR);
Jin-Guk Kim, Seoul (KR)

(73) Assignee: JPI Healthcare CO., LTD., Seoul (KR)

( * ) Notice: Subject to any disclaimer, the term of this patent is extended or adjusted under 35 U.S.C. 154(b) by 0 days.

(21) Appl. No.: 17/700,613

(22) Filed: Mar. 22, 2022

(65) Prior Publication Data

US 2022/0365005 A1  Nov. 17, 2022

(30) Foreign Application Priority Data

May 12, 2021  (KR) .......................... 10-2021-0061583

(51) Int. Cl.
*G01N 23/044* (2018.01)
*G01N 23/083* (2018.01)

(52) U.S. Cl.
CPC ......... *G01N 23/044* (2018.02); *G01N 23/083* (2013.01); *G01N 2223/3307* (2013.01); *G01N 2223/3308* (2013.01); *G01N 2223/401* (2013.01)

(58) Field of Classification Search
None
See application file for complete search history.

(56) References Cited

U.S. PATENT DOCUMENTS

2008/0025461 A1* 1/2008 Foland ................ G01N 23/046
378/4

FOREIGN PATENT DOCUMENTS

KR   10-2017-0021723 A   2/2017

\* cited by examiner

*Primary Examiner* — Hoon K Song
(74) *Attorney, Agent, or Firm* — The PL Law Group, PLLC

(57) ABSTRACT

A real-time inline digital tomosynthesis system according to an embodiment of the present disclosure includes a subject moving rail configured to move a subject in a preset direction and at a preset speed, a pair of an X-ray generator and an X-ray detector fixedly provided to face each other in a first direction of the subject moving rail, a subject position identifier configured to identify and notify a current position of the subject based on an image or a sensor, and an image reconstructor configured to obtain a plurality of X-ray images having different subject positions through the X-ray detector based on the current position of the subject, and then reconstruct and output the plurality of X-ray images as at least one of a tomographic image for each section and one three-dimensional (3D) image.

10 Claims, 7 Drawing Sheets

REAL-TIME INLINE DIGITAL TOMOSYNTHESIS SYSTEM

CROSS-REFERENCE TO RELATED APPLICATION

This application claims the benefit under 35 USC § 119 of Korean Patent Application No. 10-2021-0061583, filed on May 12, 2021, in the Korean Intellectual Property Office, the entire disclosure of which is incorporated herein by reference for all purposes.

BACKGROUND

1. Field

The present disclosure relates to a real-time inline digital tomosynthesis system applicable to an industrial inline environment.

2. Description of the Related Art

A digital tomosynthesis system (DTS) is a device that three dimensionally reconstructs an image by using projected image data obtained from multiple angles within a limited angle.

That is, after an X-ray image for each shooting angle is obtained by fixing a subject immovably and moving an X-ray generator and an X-ray detector, the X-ray image is reconstructed to obtain tomographic images of a specific section of the subject, and then is reconstructed and output as one three-dimensional (3D) image.

However, although the DTS may obtain a 3D image at a high speed, it is difficult to apply the DTS to an industrial inline environment because the X-ray generator and the X-ray detector should be moved.

SUMMARY

In order to solve the problems, there is provided a real-time inline digital tomosynthesis system capable of obtaining, in real time, a three-dimensional (3D) image for determining whether a subject is abnormal by using an inline method of moving the subject, instead of an X-ray generator and an X-ray detector.

There is also provided a real-time inline digital tomosynthesis system capable of easily increasing the number of X-ray generators and X-ray detectors.

Objectives of the present disclosure are not limited thereto, and other unmentioned objectives will be clearly understood by one of ordinary skill in the art to which the present disclosure pertains from the following description.

According to an embodiment of the present disclosure, a real-time inline digital tomosynthesis system includes: a subject moving rail configured to move a subject in a preset direction and at a preset speed; a pair of an X-ray generator and an X-ray detector fixedly provided to face each other in a first direction of the subject moving rail; a subject position identifier configured to identify and notify a current position of the subject based on an image or a sensor; and an image reconstructor configured to obtain a plurality of X-ray images having different subject positions through the X-ray detector based on the current position of the subject, and then reconstruct and output the plurality of X-ray images as at least one of a tomographic image for each section and one three-dimensional (3D) image.

The real-time inline digital tomosynthesis system may further include at least one pair of an X-ray generator and an X-ray detector fixedly provided to face each other in a direction different from the first direction of the subject moving rail, wherein, when a plurality of pairs of the X-ray generators and the X-ray detectors are provided, installation directions of the plurality of pairs of the X-ray generators and the X-ray detectors are different from one another with respect to the subject moving rail.

The real-time inline digital tomosynthesis system may further include at least one pair of an X-ray generator and an X-ray detector fixedly provided to be adjacent to each other in a same direction as the first direction of the subject moving rail, wherein an image acquisition angle of a digital tomographic image is increased in proportion to a number of pairs of the X-ray generators and the X-ray detectors.

The first direction of the subject moving rail may be any direction.

The subject position identifier may be configured to infer and notify the current position of the subject based on a relative position value of the subject in an X-ray image.

The subject position identifier may be configured to measure and notify the current position of the subject, by using a distance sensor for sensing and notifying a distance between a starting point of the subject moving rail and the current subject.

The subject position identifier may be configured to measure and notify the current position of the subject, by using a plurality of object detection sensors distributed at preset positions and configured to sense and notify the existence of the subject.

DETAILED DESCRIPTION

The following description illustrates only a principle of the present disclosure. Therefore, one of ordinary skill in the art may implement the principle of the present disclosure and invent various devices included in the spirit and scope of the present disclosure although not clearly described or shown in the present specification. In addition, it is to be understood that all conditional terms and embodiments mentioned in the present specification are basically intended only to allow one of ordinary skill in the art to understand a concept of the present disclosure, and the present disclosure is not limited to embodiments and states particularly mentioned as such.

Further, it is to be understood that all detailed descriptions mentioning a specific exemplary embodiment of the present disclosure as well as principles, aspects, and exemplary embodiments of the present disclosure are intended to include structural and functional equivalences thereof. Further, it is to be understood that these equivalences include an equivalence that will be developed in the future as well as an equivalence that is current well-known, that is, all devices invented so as to perform the same function regardless of a structure.

Therefore, it is to be understood that, for example, a block diagram of the present specification shows an illustrative conceptual aspect for embodying a principle of the present disclosure. Similarly, it is to be understood that all flowcharts, state transition diagrams, pseudo-code, and the like, show various processes that may be tangibly embodied in a computer-readable medium and that are executed by computers or processors regardless of whether or not the computers or the processors are clearly shown.

Figure 1:
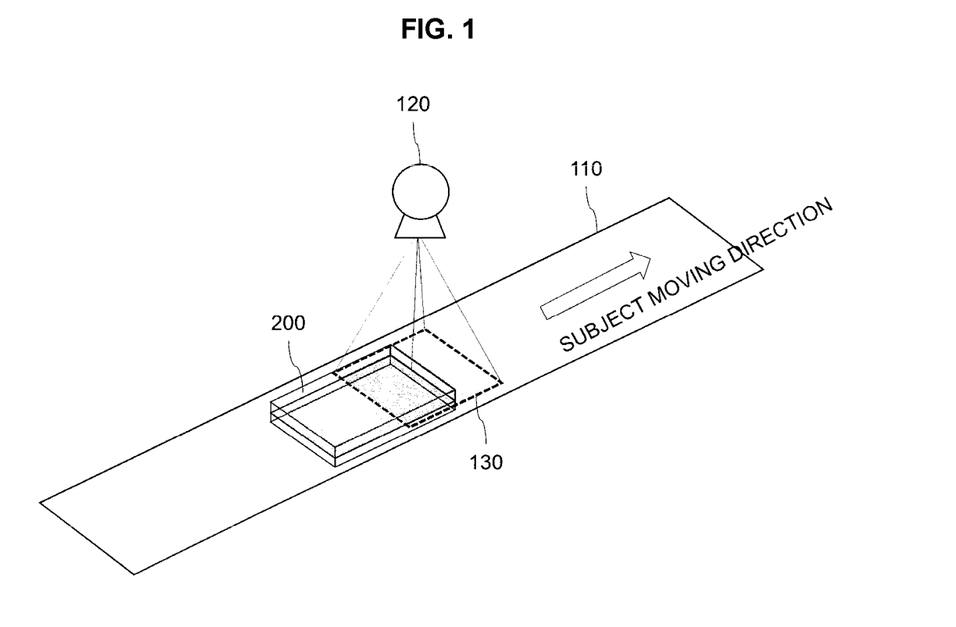
FIGS. 1 and 2 are views for describing a real-time inline digital tomosynthesis system according to First Embodiment of the present disclosure.
Figure 2:
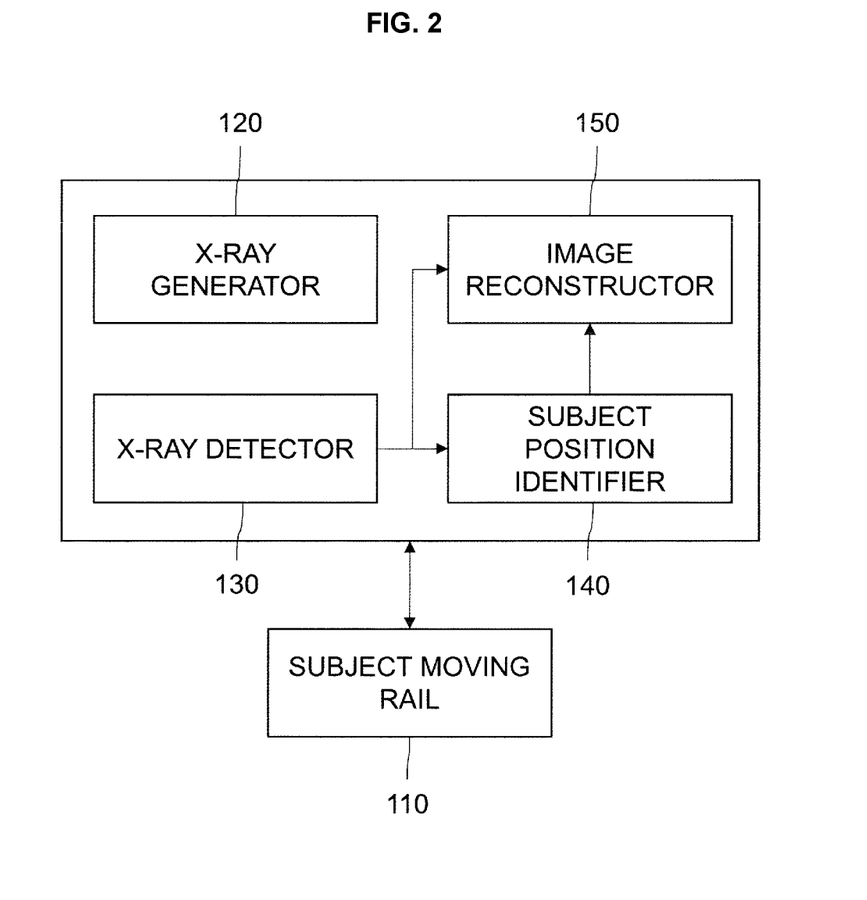

FIGS. 1 and 2 are views for describing a real-time inline digital tomosynthesis system according to First Embodiment of the present disclosure. FIG. 1 illustrates an outer appearance. FIG. 2 illustrates a configuration.

As shown in FIGS. 1 and 2, a digital tomosynthesis system of the present disclosure includes a subject moving rail 110, an X-ray generator 120, an X-ray detector 130, a subject position identifier 140, and an image reconstructor 150.

The subject moving rail 110 is configured to provide a subject support space and move a subject 200 placed in the subject support space at a certain speed and in a certain direction.

The X-ray generator 120 is fixedly provided in a first direction (e.g., vertical direction) of the subject moving rail 110, and is configured to continuously or repeatedly generate X-rays having the same irradiation angle.

The X-ray detector 130 is fixedly provided in the first direction of the subject moving rail 110 to face the X-ray generator 120 with the subject 200 therebetween, and is configured to continuously and repeatedly obtain and output X-ray images having different subject positions.

The subject position identifier 140 may infer and notify a current position of a subject based on a relative position value of the subject in an X-ray image.

Alternatively, a current position of a subject may be directly measured and notified, by using a distance sensor configured to sense and notify a distance between a starting point of the subject moving rail 110 and the current subject and a plurality of object detection sensors distributed at preset positions and configured to sense and notify the existence of the subject. However, a specific implementation method is not limited thereto.

The image reconstructor 150 obtains a plurality of X-ray images having different subject positions (i.e., X-ray images according to subject positions), by selectively receiving an output image of the X-ray detector 130 based on the current position of the subject identified by the subject position identifier 140. The X-ray images according to subject positions may be reconstructed into at least one of a tomographic image for each section of the subject and one three-dimensional (3D) image and may be output to a user.

Figure 3:
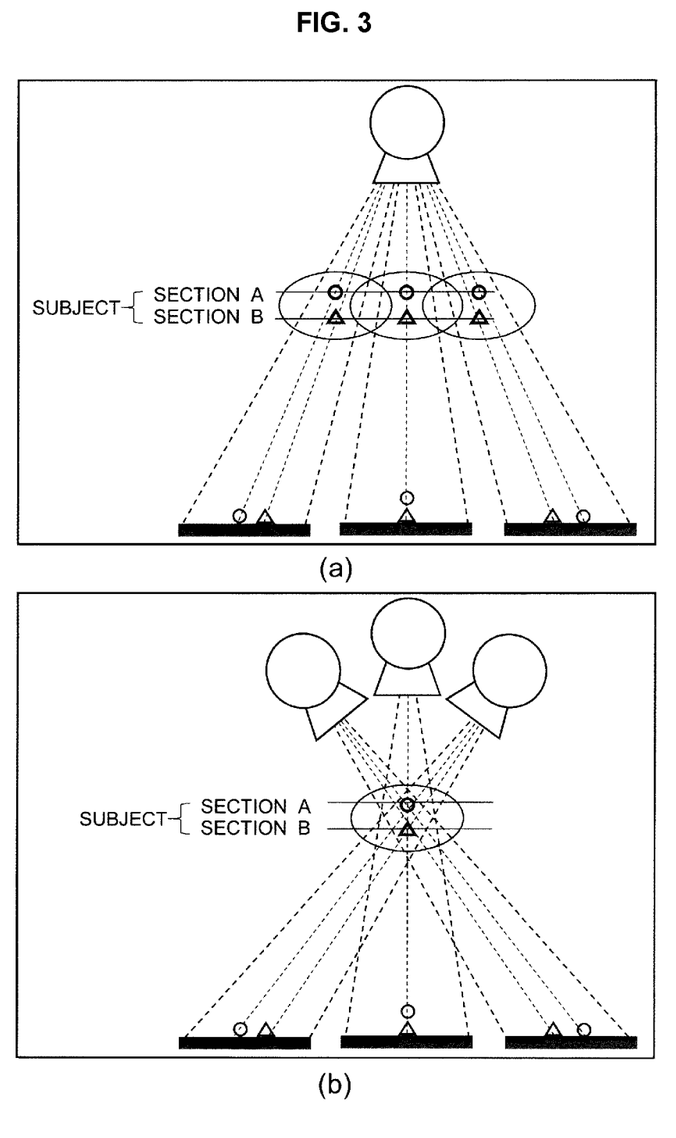
FIG. 3 is a view illustrating an X-ray image for each subject position obtained according to First Embodiment of the present disclosure.

FIG. 3 is a view illustrating an X-ray image for each subject position obtained according to First Embodiment of the present disclosure.

As shown in (a) of FIG. 3, according to the present disclosure, X-ray images according to subject positions may be obtained by using a method of moving a subject instead of an X-ray generator and an X-ray detector, and in this case, the X-ray images may have different X-ray shooting angles according to subject positions.

That is, even when a subject is moved, as shown in (b) of FIG. 3, the same image characteristics as those of X-ray images according to shooting angles obtained by moving an X-ray generator and an X-ray detector may be achieved.

Figure 4:
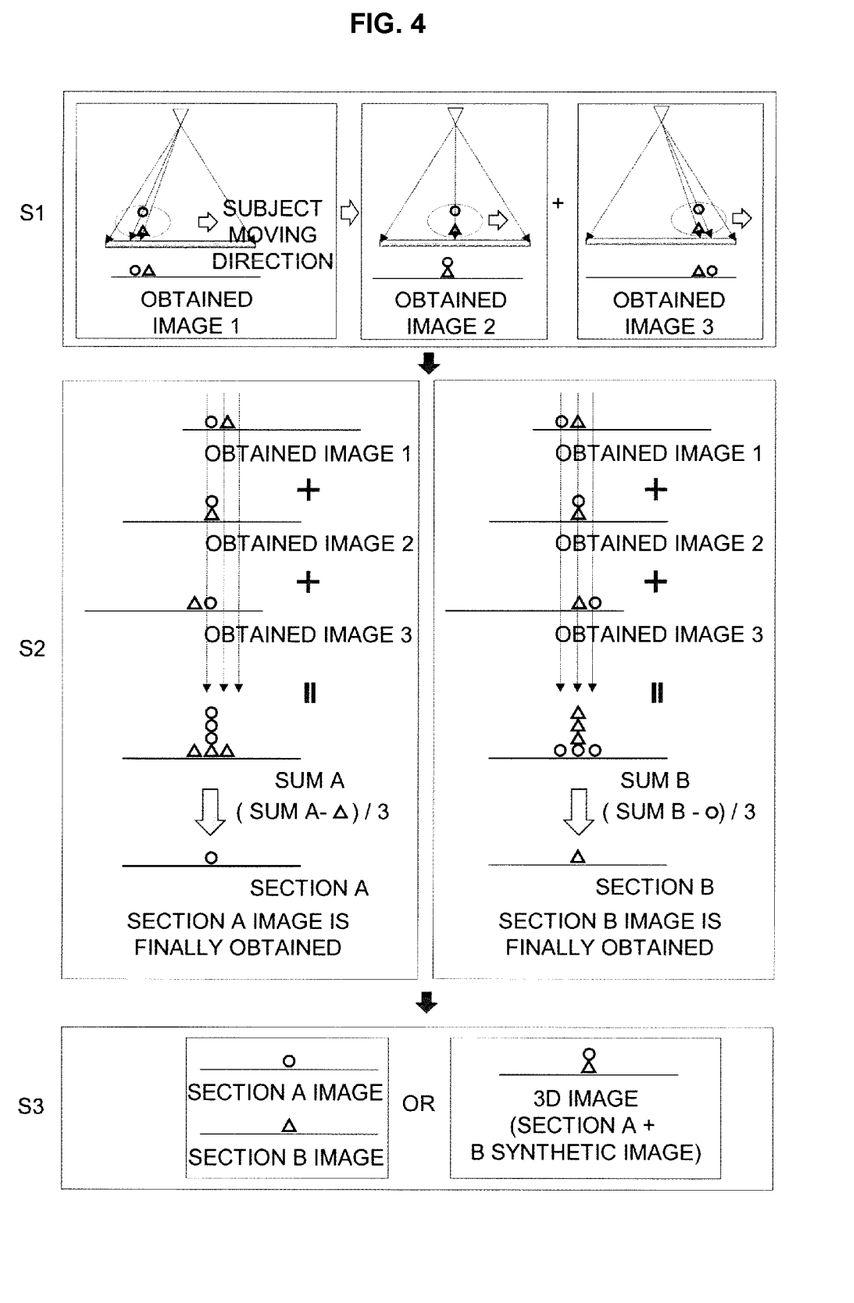
FIG. 4 is a view for describing a method of reconstructing an image according to First Embodiment of the present disclosure.

FIG. 4 is a view for describing a method of reconstructing an image according to First Embodiment of the present disclosure. For convenience of explanation, the following will be described assuming that images of a subject are obtained at a total of 3 positions.

In operation S1, when image acquisition is requested in a state where a subject is placed on the subject moving rail 110, the subject moving rail 110 begins to move the subject in a preset direction and at a preset speed in response to the request.

The subject position identifier 140 identifies and notifies a current position of the subject in real time, and the image reconstructor 150 repeatedly obtains X-ray images of the subject whenever the subject is located at preset points 1, 2, 3. In this case, the X-ray images may be projected image data for all voxels constituting the subject.

In operation S2, the X-ray images obtained at subject positions (i.e., projected image data of the voxels) are summed to calculate entire overlapped image data.

For the subject positions, three complementary overlapped image data are calculated by summing the X-ray images excluding a specific section, a difference between the three complementary overlapped image data and the entire overlapped image data is calculated, and an image processing operation for normalization may be repeatedly performed by dividing the difference between the three complementary overlapped image data and the entire overlapped image data by 3 that is the total number of X-ray images, to obtain a plurality of tomographic images respectively corresponding to a plurality of sections (i.e., tomographic images according to sections).

In operation S3, the tomographic images according to sections obtained in operation S2 may be provided to a user, or the tomographic images according to sections may be sequentially stacked in the order of sections to be synthesized into one 3D image, and then may be provided to the user.

Figure 5:
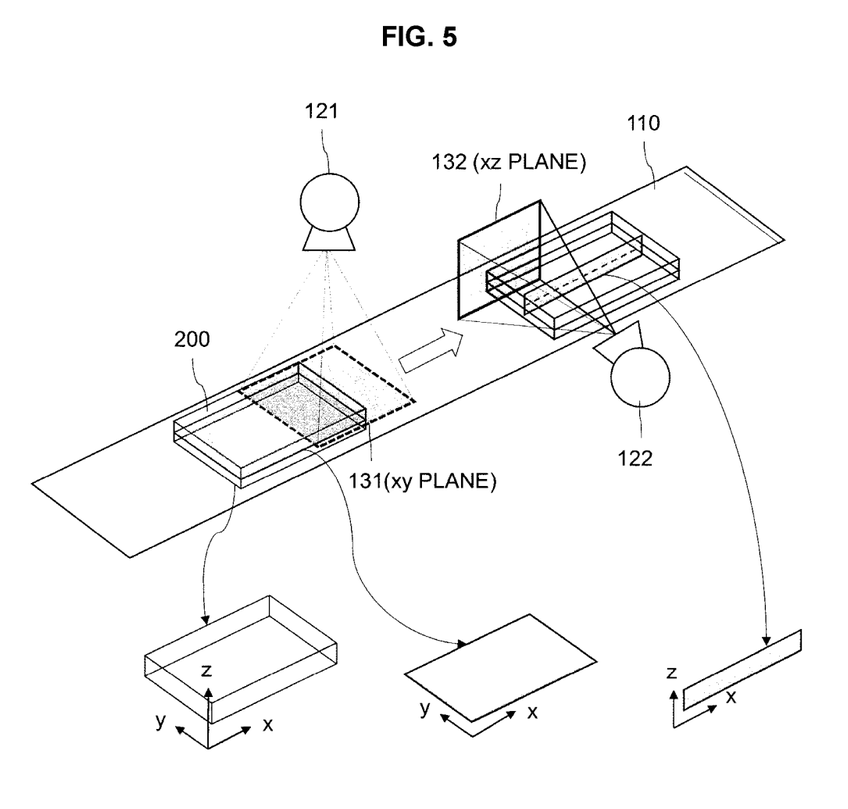
FIG. 5 is a view for describing a real-time inline digital tomosynthesis system according to Second Embodiment of the present disclosure.

FIG. 5 is a view for describing a real-time inline digital tomosynthesis system according to Second Embodiment of the present disclosure.

As shown in FIG. 5, in the digital tomosynthesis system of the present disclosure, a plurality of pairs of the X-ray generators 120 and the X-ray detectors 130 may be provided, and then tomographic images of different sections may be obtained through the plurality of pairs of the X-ray generators 120 and the X-ray detectors 130.

For example, two pairs of the X-ray generators 120 and the X-ray detectors 130 may be provided, and a first X-ray generator 121 and a first X-ray detector 131 may be provided to face each other in the first direction (e.g., vertical direction) of the subject moving rail 110 and a second X-ray generator 122 and a second X-ray detector 132 may be provided to face each other in a second direction (e.g., horizontal direction) perpendicular to the first direction of the subject moving rail 110.

In this case, tomographic images of an xy section may be obtained and provided through the first X-ray generator 121 and the first X-ray detector 131 provided to face each other in the first direction of the subject moving rail 110, and tomographic images of an xz section may be obtained and provided through the second X-ray generator 122 and the second X-ray detector 132 provided to face each other in the second direction of the subject moving rail 110.

That is, in the present disclosure, the number of the X-ray generators 120 and X-ray detectors 130 which are used may be easily increased, and thus the number of sections (e.g., the xy section and the xz section) which may be detected through the X-ray generators 120 and the X-ray detectors 130 may also be easily increased. As a result, the type and amount of information that may be provided to a user through the same system may be increased.

Figure 6:
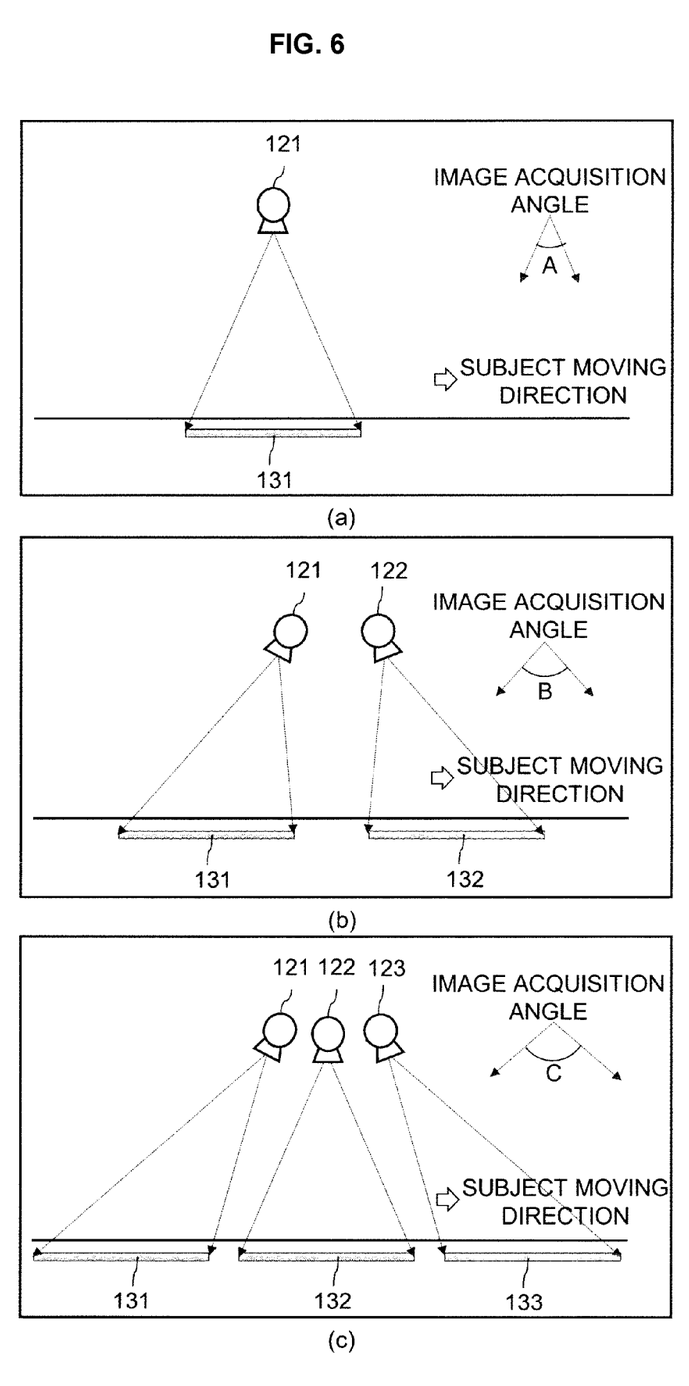
FIG. 6 is a view for describing a real-time inline digital tomosynthesis system according to Third Embodiment of the present disclosure.

FIG. 6 is a view for describing a real-time inline digital tomosynthesis system according to Third Embodiment of the present disclosure.

As shown in (a) through (c) of FIG. 6, in the digital tomosynthesis system of the present disclosure, because a plurality of pairs of the X-ray generators 120 and the X-ray detectors 130 may be provided, and the plurality of pairs of the X-ray generators 120 and the X-ray detectors 130 may be fixedly provided to be adjacent to one another in the same direction, thereby increasing an image acquisition angle.

For example, as shown in (b) of FIG. 6, two pairs of the X-ray generators 120 and the X-ray detectors 130 may be provided parallel to the first direction (e.g., vertical direction) of the subject moving rail 110, and the first X-ray generator 121 may be inclined toward a front end of the subject moving rail 110 and the second X-ray generator 122 may be inclined toward a rear end of the subject moving rail 110.

Also, as shown in (c) of FIG. 6, three pairs of the X-ray generators 120 and the X-ray detectors 130 may be provided parallel to the first direction (e.g., vertical direction) of the subject moving rail 110, and the first X-ray generator 121 may be inclined toward a front end of the subject moving rail 110, the second X-ray generator 122 may be inclined toward a rear end of the subject moving rail 110, and a third X-ray generator 123 may be inclined toward the rear end of the subject moving rail 110.

As a result, it is found that an image acquisition angle of the digital tomosynthesis system is easily increased in proportion to the number of pairs of the X-ray generators 120 and X-ray detectors 130 (A<B<C).

Figure 7:
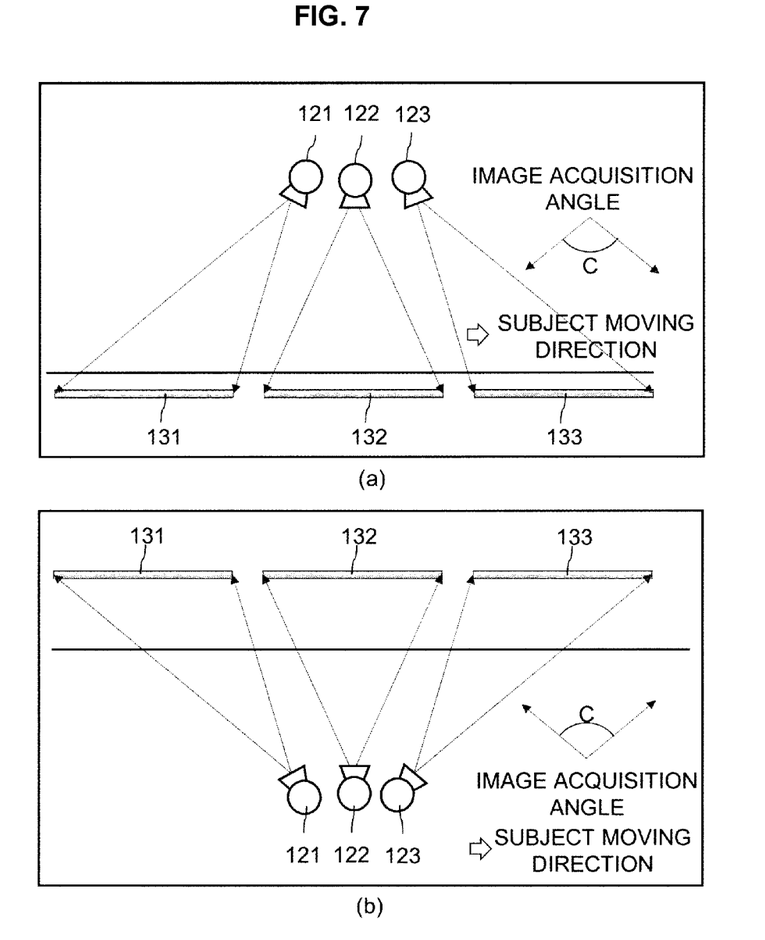
FIG. 7 is a view for describing a real-time inline digital tomosynthesis system according to Fourth Embodiment of the present disclosure.

FIG. 7 is a view for describing a real-time inline digital tomosynthesis system according to Fourth Embodiment of the present disclosure.

As shown in (a) and (b) of FIG. 7, in the digital tomosynthesis system of the present disclosure, pairs of the X-ray generators 120 and the X-ray detectors 130 may be arranged in all directions.

For example, the X-ray generator 120 may be located over the subject moving rail 110 so that an X-ray of the X-ray generator 120 is emitted downward, the X-ray generator 120 may be located under the subject moving rail 110 so that an X-ray of the X-ray generator 120 is emitted upward, or the X-ray generator 120 may be located on a side surface so that an X-ray is emitted to a side.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A real-time inline digital tomosynthesis system comprising:
    a subject moving rail configured to move a subject in a preset direction and at a preset speed;
    a pair of an X-ray generator and an X-ray detector fixedly provided to face each other in a first direction of the subject moving rail;
    a subject position identifier configured to identify and notify a current position of the subject based on an image or a sensor; and
    an image reconstructor configured to obtain a plurality of X-ray images having different subject positions through the X-ray detector based on the current position of the subject, and then reconstruct and output the plurality of X-ray images as at least one of a tomographic image for each section and one three-dimensional (3D) image,
    wherein the subject position identifier is configured to measure and notify the current position of the subject, by using a distance sensor for sensing and notifying a distance between a starting point of the subject moving rail and the current subject.

2. The real-time inline digital tomosynthesis system of claim 1, further comprising:
    at least one pair of an X-ray generator and an X-ray detector fixedly provided to face each other in a direction different from the first direction of the subject moving rail,
    wherein, when a plurality of pairs of the X-ray generators and the X-ray detectors are provided, installation directions of the plurality of pairs of the X-ray generators and the X-ray detectors are different from one another with respect to the subject moving rail.

3. The real-time inline digital tomosynthesis system of claim 1, further comprising:
    at least one pair of an X-ray generator and an X-ray detector fixedly provided to be adjacent to each other in a same direction as the first direction of the subject moving rail,
    wherein an image acquisition angle of a digital tomographic image is increased in proportion to a number of pairs of the X-ray generators and the X-ray detectors.

4. The real-time inline digital tomosynthesis system of claim 1, wherein the first direction of the subject moving rail is any direction.

5. The real-time inline digital tomosynthesis system of claim 1, wherein the subject position identifier is configured to infer and notify the current position of the subject based on a relative position value of the subject in an X-ray image.

6. A real-time inline digital tomosynthesis system comprising:
    a subject moving rail configured to move a subject in a preset direction and at a preset speed;
    a pair of an X-ray generator and an X-ray detector fixedly provided to face each other in a first direction of the subject moving rail;
    a subject position identifier configured to identify and notify a current position of the subject based on an image or a sensor; and
    an image reconstructor configured to obtain a plurality of X-ray images having different subject positions through the X-ray detector based on the current position of the subject, and then reconstruct and output the plurality of X-ray images as at least one of a tomographic image for each section and one three-dimensional (3D) image, wherein the subject position identifier is configured to measure and notify the current position of the subject, by using a plurality of object detection sensors distributed at preset positions and configured to sense and notify the existence of the subject.

7. The real-time inline digital tomosynthesis system of claim 6, further comprising:
at least one pair of an X-ray generator and an X-ray detector fixedly provided to face each other in a direction different from the first direction of the subject moving rail,
wherein, when a plurality of pairs of the X-ray generators and the X-ray detectors are provided, installation directions of the plurality of pairs of the X-ray generators and the X-ray detectors are different from one another with respect to the subject moving rail.

8. The real-time inline digital tomosynthesis system of claim 6, further comprising:
at least one pair of an X-ray generator and an X-ray detector fixedly provided to be adjacent to each other in a same direction as the first direction of the subject moving rail,
wherein an image acquisition angle of a digital tomographic image is increased in proportion to a number of pairs of the X-ray generators and the X-ray detectors.

9. The real-time inline digital tomosynthesis system of claim 6, wherein the first direction of the subject moving rail is any direction.

10. The real-time inline digital tomosynthesis system of claim 6, wherein the subject position identifier is configured to infer and notify the current position of the subject based on a relative position value of the subject in an X-ray image.

* * * * *